(12) United States Patent
Willi et al.

(10) Patent No.: US 12,151,736 B2
(45) Date of Patent: Nov. 26, 2024

(54) STEERING COLUMN FOR A MOTOR VEHICLE

(71) Applicants: thyssenkrupp Presta AG, Eschen (LI); thyssenkrupp AG, Essen (DE)

(72) Inventors: Andreas Willi, Lauterach (AT); Daniel Kreutz, Feldkirch (AT); Simon Blaettler, Grabs (CH); Patrick Riedmann, Dornbirn (AT); Tamás Fejes, Mezőkoevesd (HU)

(73) Assignees: thyssenkrupp Presta AG, Eschen (LI); thyssenkrupp AG, Essen (DE)

( * ) Notice: Subject to any disclaimer, the term of this patent is extended or adjusted under 35 U.S.C. 154(b) by 0 days.

(21) Appl. No.: 18/195,014

(22) Filed: May 9, 2023

(65) Prior Publication Data
US 2023/0365182 A1    Nov. 16, 2023

(30) Foreign Application Priority Data

May 11, 2022   (EP) .................................... 22172752

(51) Int. Cl.
| | | |
|---|---|---|
| *B62D 1/181* | (2006.01) | |
| *B62D 1/187* | (2006.01) | |
| *B62D 5/00* | (2006.01) | |
| *B62D 15/02* | (2006.01) | |

(52) U.S. Cl.
CPC ............. *B62D 1/181* (2013.01); *B62D 1/187* (2013.01); *B62D 5/001* (2013.01); *B62D 15/022* (2013.01)

(58) Field of Classification Search
CPC ........ B62D 1/181; B62D 1/187; B62D 5/001; B62D 15/022; G01B 7/003; G01D 2205/90
See application file for complete search history.

(56) References Cited

U.S. PATENT DOCUMENTS

| | | | |
|---|---|---|---|
| 10,974,756 B2 * | 4/2021 | Cana ..................... | B62D 1/181 |
| 2004/0017190 A1 * | 1/2004 | McDearmon .......... | G01D 5/147 |
| | | | 324/207.2 |
| 2004/0032121 A1 * | 2/2004 | Schafer ................. | B62D 1/181 |
| | | | 280/775 |
| 2018/0086378 A1 * | 3/2018 | Bell ....................... | B62D 1/181 |

(Continued)

FOREIGN PATENT DOCUMENTS

| | | | | |
|---|---|---|---|---|
| DE | 102004044472 A1 * | 3/2006 | ............. | B62D 1/181 |
| DE | 102020109779 A1 | 10/2020 | | |

(Continued)

*Primary Examiner* — Drew J Brown
(74) *Attorney, Agent, or Firm* — thyssenkrupp North America, LLC

(57) ABSTRACT

A steering column for a motor vehicle including a first component, a second component, wherein the first component and the second component are adjustable relative to one another in two non-parallel adjustment directions. A position detection device having a sensor connected to the first component including at least one sensor unit and a sensor target connected to the second component comprising at least one target unit, wherein the sensor is configured to detect relative position of the sensor target, wherein the target unit includes a measurement portion extending in the two adjustment directions which has a local measuring quantity varying in each of the two adjustment directions that can be detected locally by the sensor unit.

19 Claims, 2 Drawing Sheets

(56) References Cited

U.S. PATENT DOCUMENTS

| | | | |
|---|---|---|---|
| 2018/0148084 A1* | 5/2018 | Nash | B60Q 9/00 |
| 2020/0324814 A1 | 10/2020 | Riley et al. | |
| 2020/0339176 A1* | 10/2020 | Cao | G05D 1/0061 |
| 2021/0031823 A1 | 2/2021 | Watanabe et al. | |
| 2021/0291890 A1* | 9/2021 | Kreutz | B60R 21/01 |
| 2021/0309281 A1 | 10/2021 | Rouleau et al. | |
| 2022/0258789 A1* | 8/2022 | Vitalis | B62D 1/181 |
| 2023/0001983 A1* | 1/2023 | Yamashita | B62D 6/008 |
| 2023/0182802 A1* | 6/2023 | Bayer | B62D 1/185 |
| | | | 280/775 |
| 2024/0010276 A1* | 1/2024 | Heo | B62D 5/046 |

FOREIGN PATENT DOCUMENTS

| | | | | |
|---|---|---|---|---|
| DE | 102020117865 A1 * | 1/2021 | | B62D 1/185 |
| DE | 102020202536 A1 | 9/2021 | | |
| DE | 102021108224 A1 | 10/2021 | | |
| EP | 3771619 A1 | 2/2021 | | |

* cited by examiner

STEERING COLUMN FOR A MOTOR VEHICLE

CROSS REFERENCE TO RELATED APPLICATION

This application is a U.S. Non-Provisional that claims priority to European Patent Application No. EP 22172752.2, filed May 11, 2022, the entire content of which is incorporated herein by reference.

FIELD

The present disclosure generally relates to a steering column for a motor vehicle, and more particularly to a steering column with two components adjustable relative to one another in two non-parallel adjustment directions and a position detection device.

BACKGROUND

Description of Related Art

In order to optimally activate safety systems related to steering columns, for automated setting of an individual steering wheel position, or in order to adjust the steering column in the autonomous driving operation of an autonomously driving vehicle from the operating position into a stowed position remote therefrom outside the operating range, it is necessary to detect the respective current adjustment position in both adjustment directions. For this purpose, a steering column with a position detection device is known in the prior art, for example from DE 10 2020 202 536 A1, which has a sensor and a sensor target interacting therewith, for detecting the position of components that can be moved relative to one another.

Due to the fact that a sensor unit and a corresponding target unit must be provided in each case for each of both adjustment directions in the known position detection device, a relatively high manufacturing and assembly outlay and a high installation space requirement arise.

Thus, a need exists to make possible position detection in two adjustment directions with lower costs and simpler assembly methods.

SUMMARY

A steering column has at its rear end facing the driver position with respect to the direction of travel of the vehicle, a manual steering handle for inputting steering commands, for example a steering wheel rotatable about a longitudinal axis in a setting unit. At a distance from this steering wheel-side end, the steering column is fastened to the vehicle body in a body-side region, usually via a support unit.

For the user-friendly adaptation of the steering wheel position to the driver position, it is provided that, for a longitudinal adjustment, the steering handle can be positioned relative to the vehicle body in the longitudinal direction given by the longitudinal axis, and, for a height adjustment, it can be positioned transversely to the longitudinal direction in a height direction. In order to realize the longitudinal adjustment, a setting unit carrying the steering handle can be telescopically accommodated in a casing unit, which can also be referred to as a guide box or box rocker, in the longitudinal direction, which defines a first adjustment direction. The height adjustment can take place in that the casing unit is mounted on the support unit in a front region so as to be pivotable or displaceable about a horizontal axis, so that the steering handle can be pivoted in the height direction, which defines a second adjustment direction of the setting unit relative to the support unit which is non-parallel to the longitudinal direction.

For this purpose, for each of the two adjustment directions, a sensor unit is provided which is connected to a component, for example the casing unit or the support unit, and which interacts with a target unit that is fixed to another component, for example the setting unit or the casing unit, which can be adjusted relative to the one component. For each of both adjustment directions, a sensor pair formed by a sensor unit and a corresponding target unit is provided, each having a one-dimensional measurement portion extending linearly in the respective adjustment direction. As a result, the relative positioning of two components adjustable relative to one another in an adjustment direction can be detected in each case by a sensor unit and the associated target unit and can be passed on to an electronic control unit as an electrical measurement signal. The latter can generate electrical control signals therefrom and control electromotive actuators in order to automatically adjust the steering column in both adjustment directions, for example into the stowed position or a safety position.

These and other features of the systems and methods of the subject disclosure will become more readily apparent to those skilled in the art from the following detailed description of the preferred embodiments taken in conjunction with the drawings.

BRIEF DESCRIPTION OF THE FIGS.

So that those skilled in the art to which the subject invention appertains will readily understand how to make and use the devices and methods of the subject invention without undue experimentation, preferred embodiments thereof will be described in detail herein below with reference to certain figures, wherein.

DETAILED DESCRIPTION

Figure 1:
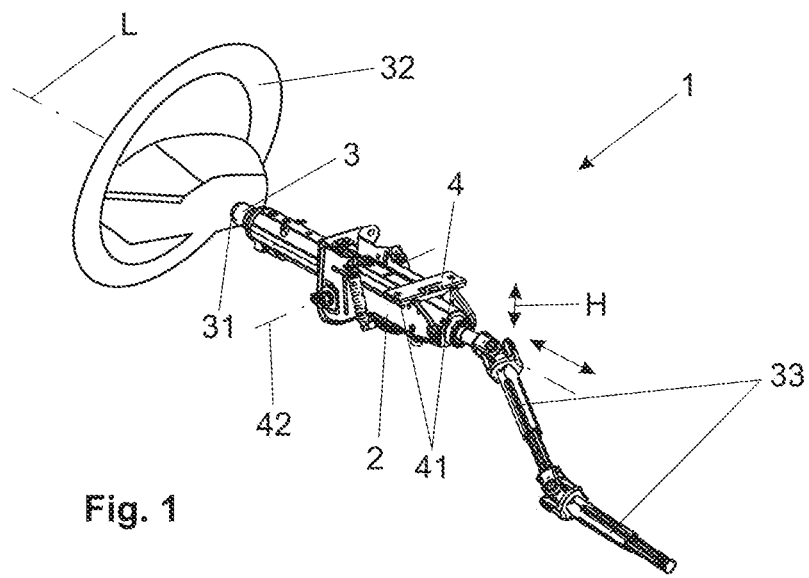
FIG. 1 is a schematic perspective view of a steering column according to the disclosure.

Although certain example methods and apparatus have been described herein, the scope of coverage of this disclosure is not limited thereto. On the contrary, this disclosure covers all methods, apparatus, and articles of manufacture fairly falling within the scope of the appended claims either literally or under the doctrine of equivalents. Moreover, those having ordinary skill in the art will understand that reciting "a" element or "an" element in the appended claims does not restrict those claims to articles, apparatuses, systems, methods, or the like having only one of that element, even where other elements in the same claim or different claims are preceded by "at least one" or similar language. Similarly, it should be understood that the steps of any method claims need not necessarily be performed in the order in which they are recited, unless so required by the context of the claims. In addition, all references to one skilled in the art shall be understood to refer to one having ordinary skill in the art.

The disclosure relates to a steering column for a motor vehicle, which has two components adjustable relative to one another in two non-parallel adjustment directions and a position detection device which has a sensor connected to the one component comprising at least one sensor unit, and has a sensor target connected to the other component comprising at least one target unit, the sensor being configured to detect the relative position of the sensor target. The disclosure also relates to a method for operating such a steering column.

In case of a steering column for a motor vehicle, which has two components adjustable relative to one another in two non-parallel adjustment directions and a position detection device which has a sensor connected to the one component comprising at least one sensor unit, and has a sensor target connected to the other component comprising at least one target unit, the sensor being configured to detect the relative position of the sensor target, it is provided according to the disclosure that the target unit has a measurement portion extending in the two adjustment directions which has a local measuring quantity varying in each of the two adjustment directions that can be detected locally by the sensor unit.

In the following, the two adjustment directions are also referred to as both adjustment directions. The operative combination of a sensor unit with an associated target unit can also be referred to as a sensor pair.

The target unit configured according to the disclosure is distinguished in that it has a two-dimensionally effective measurement portion which is adapted to enable position measurements in two non-parallel measurement directions. It preferably extends parallel to a measurement plane spanned by both adjustment directions. The surface of the measurement portion which can be used for position measurement forms a two-dimensional measuring surface which can be identical to the total surface of the measurement portion.

In each defined surface portion of the measurement portion or in each point which corresponds to a defined surface coordinate within the measurement portion, the measurement portion has a local, defined measuring quantity which changes, viewed over the extent in each of both possible adjustment directions, for example a gradient. For example, the measuring quantity can increase in the longitudinal direction and increase transversely thereto in the height direction at any point of the longitudinal extent. In this case, the course of the measuring quantity, viewed in an adjustment direction, can be linear, non-linear, continuous or non-continuous.

One advantage is that the local measuring quantity can be detected by means of a single sensor unit. The local measured value determined in this case can be correlated simultaneously with a longitudinal position and a height position of the components adjustable relative to one another. Such a measured value can be referred to as a two-dimensional measured value, in contrast to the two separate one-dimensional measured values in the prior art. Correspondingly, a sensor according to the disclosure, which can accordingly be referred to as a two-dimensional sensor, can advantageously be realized for the detection of both adjustment directions by a single target unit in cooperation with a sensor unit, preferably likewise with a single sensor unit. As an advantage, lower manufacturing and assembly effort can be realized, as well as a smaller size.

A further advantage of the two-dimensional sensor integrated according to the disclosure is that the functional and operational reliability can be increased compared to the two separate sensor and target units in the prior art with simultaneously lower costs.

Preferably, it can be provided that the target unit extends in a planar manner in the two adjustment directions. At least the measurement portion can be extended in a planar manner in a measurement plane parallel to the longitudinal direction and to the vertical direction. In this case, each point or each defined surface portion of the measurement plane within the measurement portion can preferably be correlated with a clearly defined measuring quantity. One advantage is that the surface of the measurement portion, which represents the measuring surface that can be used for determining the position in both adjustment directions, can be adapted to different designs and types of steering columns with little construction effort with regard to its dimensions and the course of the measuring quantities.

It may be advantageous for the target unit to be configured as one component. As an advantageous development, it is possible for the target unit to be configured as one piece. As a result, production and mounting can be simplified. In addition, the required installation space and the weight can be advantageously reduced.

It can preferably be provided that the sensor unit is configured for inductive detection of the sensor target and the target unit has a target element which has locally varying magnetic properties. The target unit can be configured, for example, as a target element or can have such a target element which, as a local measured value, has a magnetic conductivity which is variable over its measuring surface. For this purpose, the sensor unit can comprise an inductive sensor. This induces a local magnetic field into the target element and, as a local measuring quantity, detects the change in the magnetic flux through the target element, which is determined by the magnetic conductivity which varies two-dimensionally in the measuring surface. In this way, a two-dimensional measured value, which is representative of the position in the two adjustment directions, can be generated by a local measurement of the magnetic flux.

Preferably, the target unit, or at least the target element, can have a metallic material, for example iron or another ferromagnetic or ferrimagnetic material, for example ferrite or ferrite embedded in a plastic matrix or the like. It is conceivable and possible to configure the target element or the target unit as a whole by means of a sheet metal portion, a shaped sheet metal part, a formed part or the like, for example made of steel. Alternatively, the target element can be provided, for example, with a thermoplastic material filled with magnetic material, preferably as a plastic injection-moulded part. In any case, it is advantageous that the inductive measurement is contactless and relatively robust and insensitive to interference, and the target element can be provided with little effort.

In the abovementioned embodiment, it may be advantageous for the target element to have perforations and/or thickness changes which vary over its surface extent and are normal to its surface extent. The local magnetic properties can be predetermined in a defined manner by means of the varying material thickness, which can be formed in portions or continuously increasing in both adjustment directions in the measurement portion for example, and additional or alternative perforations in the form of openings.

For example, a shaped sheet metal part, for example made of steel, can have a pattern of perforations, material thinnings and/or material thickenings, which pattern is configured to be characteristic of the measuring surface. Preferably, such a target element can be configured as one component or as one piece. In any case, a low manufacturing effort and a robust construction are made possible.

It is possible for the sensor unit to be configured for capacitive measurement of a local capacitive measuring quantity of the target unit which varies over the surface, and for the target unit to have a locally varying capacitive measuring quantity. The sensor can be configured as a capacitive sensor, and the target unit can have a dielectric material at least in the measurement portion. This capacitive measuring method is based on a local change of an in-coupled electric field by the target element, which can be detected simply and contactlessly by means of an electric capacitance measurement. This is also robust and can be realized with little effort.

As a further alternative, it is possible for the sensor unit to be configured for transmissive cross-sectional measurement of one of a local cross-sectional measuring quantity of the target unit which varies over the surface, and for the target unit to have a locally varying transmissive cross-sectional measuring quantity. By means of a transmissive cross-sectional measurement, a local passing ability of the measurement portion can be used as a measuring quantity. For example, the target element can have a thickness which increases over the measuring surface in both adjustment directions. For detecting the local cross section, optical measuring methods, ultrasonic measuring methods or the like can be used, for example, which can detect locally changed dimensions and/or material changes or the like.

It is preferably provided that the position detection device has an electronic control unit. The control unit can be connected to the sensor unit for analysing the measurement signals, and output control signals, for example for controlling electric adjusting drives for adjusting the steering column.

It is preferably provided that motorized adjusting drives are provided for adjusting the components. Preferably, one adjusting drive is provided for each adjustment direction, and consequently at least two adjusting drives are provided. These can have, for example, spindle drives in a manner known per se, which are each driven by an electric motor. In each case, an adjusting drive is integrated between two components of the steering column which are adjustable relative to one another, for example for longitudinal adjustment in the longitudinal direction between a setting unit and a casing unit, and for height adjustment in the height direction between the casing unit and a support unit. Such adjusting drives are known per se and can be adapted reliably and flexibly.

It is possible for the components to comprise a setting unit, a casing unit and a support unit. The setting unit with the steering handle attached thereto is preferably adjustable relative to the casing unit in the longitudinal direction, which forms a first adjustment direction, and the casing unit is preferably adjustable relative to the support unit in a height direction, which forms a second adjustment direction transverse to the longitudinal direction. The position detection device according to the disclosure can be operatively arranged between the support unit and the setting unit which can be adjusted two-dimensionally relative thereto in the two aforementioned adjustment directions. By means of the disclosure, the complete two-dimensional position detection can be realized by means of a single sensor and target unit in each case, which is connected to the setting unit and the support unit in each case, or vice versa.

It is possible for the sensor to have an absolute value sensor and/or a relative value sensor. An absolute value sensor can be realized by the above-described inductive and other measuring methods, in which a unique absolute measured value is assigned to each two-dimensional adjustment position. The advantage of this is that no calibration is required when starting operation. Alternatively, however, it is also possible to use a relative value sensor, for example an incremental transducer, wherein, for example, an incremental pattern varying over the measuring surface of the measurement portion is evaluated as the measuring quantity. In measuring methods of this type, however, calibration is generally required during start-up.

An advantageous embodiment can provide that the sensor unit has at least two sensor elements. In this case, each of the sensor elements is configured to detect the local measuring quantity according to the disclosure. By comparing the measured values supplied by the two or more sensor elements, the measurement accuracy can be increased, and a redundant configuration of the position detection device is made possible with little effort.

It can be provided that the steering column is configured as a conventional steering column in which the steering handle, for example a steering wheel, has a mechanical connection to the wheels to be steered. The use of the disclosure is advantageous in particular also in the case of a steer-by-wire steering column. In a steer-by-wire steering system, the actuation of a steering input means, which is not mechanically connected to the wheels to be steered, for example the rotation of a steering shaft by means of a steering wheel, is detected by means of electronic sensors and converted into an electrical control signal for controlling electrical steering actuators, which result in a steering angle of the steerable wheels. Steer-by-wire steering systems can preferably be used in autonomously driving vehicles in which the steering column is automatically adjusted into a stowed position outside the operating position during autonomous driving operation. The position detection device according to the disclosure is particularly well suited for position detection in the case of the relatively large adjustment paths occurring in this case.

The disclosure further comprises a method for operating a steering column previously described, which has two components adjustable relative to one another in two non-parallel adjustment directions and a position detection device which has a sensor connected to one component comprising at least one sensor unit, and has a sensor target connected to the other component comprising at least one target unit, the sensor being configured to detect the relative position of the sensor target in the two adjustment directions, it is provided according to the disclosure that the target unit has a measurement portion extending in the two adjustment directions which has a local measuring quantity varying in each of the two adjustment directions that is detected by the sensor unit as a two-dimensional position measured value.

By means of the method according to the disclosure, the functions explained above in connection with the steering column can be realized in an advantageous manner, which can represent all the method features within the meaning of the disclosure. In this case, an advantage is that two-dimensional measured values can be acquired by means of a single target unit, which allow simplified control of the adjustment.

In the various figures, identical parts are always provided with the same reference signs and are therefore generally also only designated or mentioned once in each case.

FIG. 1 shows a steering column 1 according to the disclosure as part of a steering system of a motor vehicle which is not depicted here.

The steering column 1 comprises a casing unit 2 in which a steering spindle 3 is mounted so as to be rotatable about a longitudinal axis L. A steering wheel 32 is fastened to a fastening portion 31 at the rear end portion facing the driver position with respect to the direction of travel.

As shown in FIG. 1, the steering column 1 can be configured as a conventional steering column in which the steering spindle 3 is mechanically coupled to steerable wheels via intermediate shafts 33. Alternatively, the steering column 1 can be configured as a steer-by-wire steering column, in which the steering spindle 3 is not mechanically connected to wheels to be steered, and only protrudes at the rear, on the driver-side, for attaching the steering wheel 32. The intermediate shafts 33 are not present in this case.

The casing unit 2 is held in a support unit 4 which can be attached to the body of the vehicle. For this purpose, the support unit 4 can have fastening means 41, for example fastening holes or the like.

The steering wheel 32 is adjustable relative to the support unit 4, which is fixed to the body in the installed state, in the longitudinal direction given by the longitudinal axis L, as indicated by the double arrow. For height adjustment, the steering wheel 32 is adjustable up or down in a height direction H with respect to the support unit 4 transversely to the longitudinal axis L, as is likewise indicated by a double arrow.

The longitudinal axis L defines a first adjustment direction, and the height direction H defines a second adjustment direction, which together are also referred to as both adjustment directions.

Figure 2:
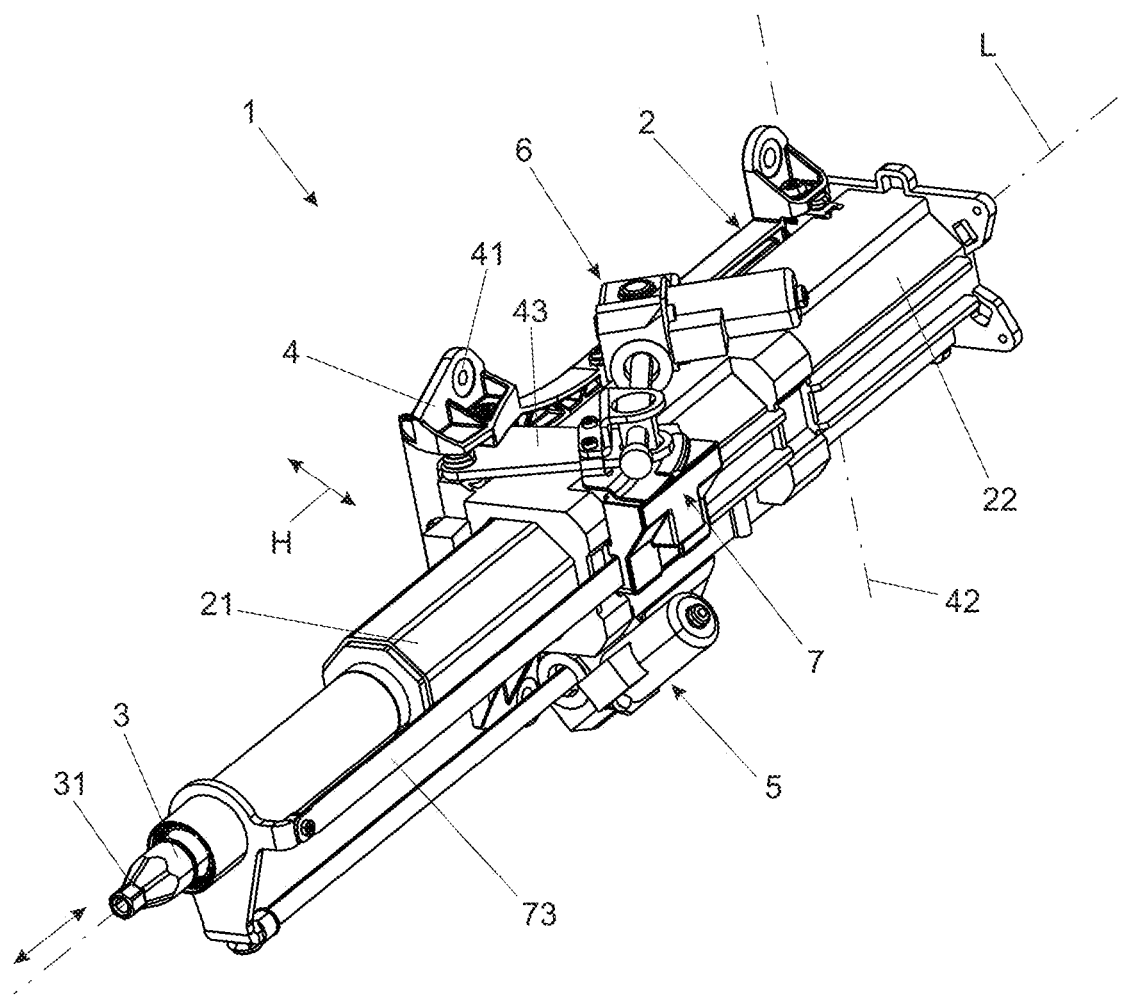
FIG. 2 is a further perspective view of the steering column according to FIG. 1.

FIG. 2 shows the steering column 1 enlarged in a laterally tilted perspective view.

The steering spindle 3 is mounted rotatably about the longitudinal axis L in an inner casing 21. For longitudinal adjustment, this inner casing 21 is accommodated telescopically in an outer casing 22 of the casing unit 2 in the direction of the longitudinal axis L.

For height adjustment, the support unit 2, specifically the outer casing 22, is mounted so as to be pivotable about a pivot axis 42 lying horizontally, transversely to the longitudinal axis L, in a region near the body, at the front with respect to the direction of travel. By pivoting about this pivot axis 42, the steering wheel 32 attached to the rear end of the steering spindle 3 remote from the vehicle body on the driver side can be adjusted in the height direction H.

For motorized longitudinal adjustment, a first adjusting drive 5 is provided, which can be configured, for example, in a manner known per se as a spindle drive and is inserted operatively between the inner casing 21 and the outer casing 22.

For motorized height adjustment, a second adjusting drive 6 is provided which, for example, can likewise be configured as a spindle drive in a manner known per se and is operatively inserted between the casing unit 2 and the support unit 4.

Figure 4:
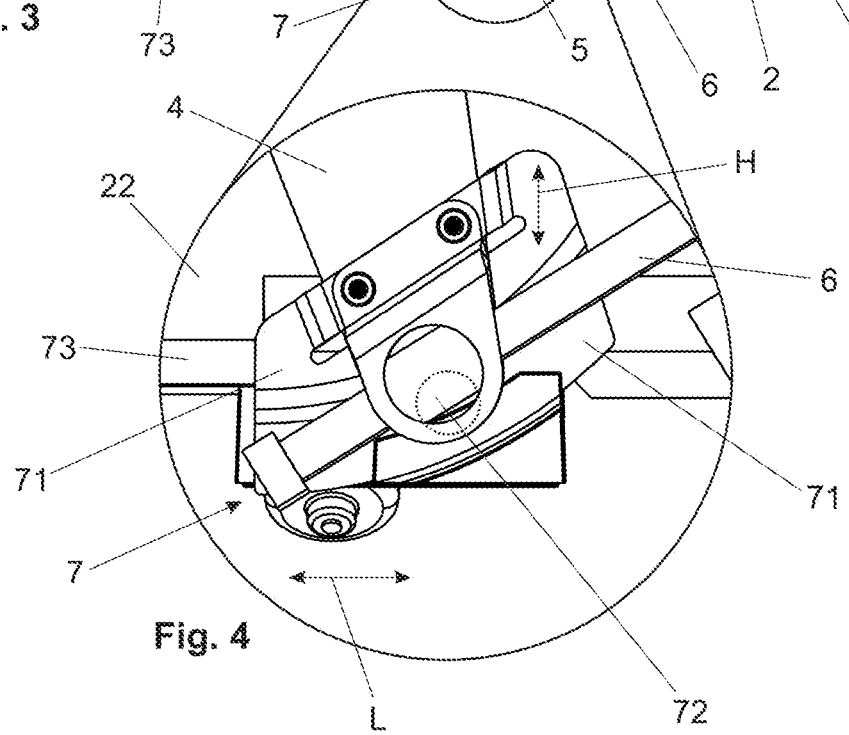
FIG. 4 is an enlarged view of a detail from FIG. 3.

FIG. 4 shows a side view of the steering column 1 transversely to the longitudinal axis L.

Figure 3:
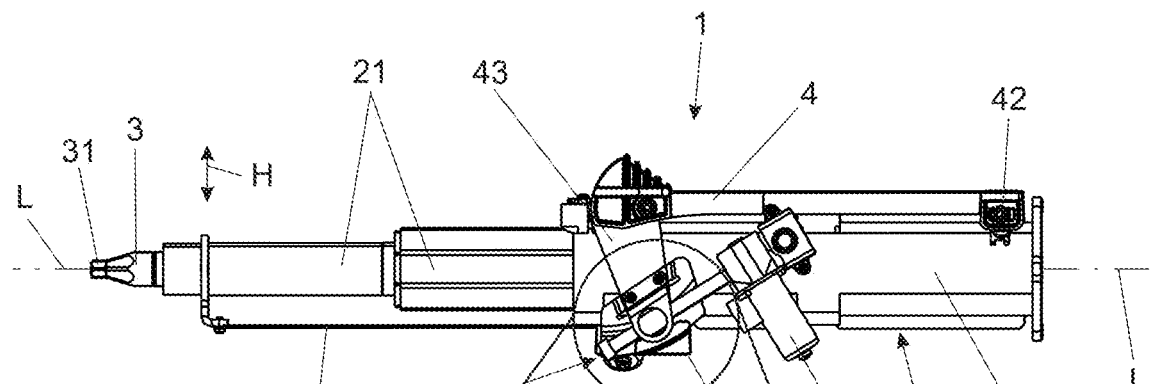
FIG. 3 is a side view of the steering column according to FIGS. 1 and 2.

A position detection device 7 according to the disclosure, which is depicted on an enlarged scale in the detail of FIG. 3 shown in FIG. 4, comprises in the example shown a target unit with a single target element 71, which interacts with a sensor unit comprising a sensor element 72, which is drawn in dashed lines in FIG. 4. In this embodiment, the target element 71 forms the target unit according to the disclosure.

The target element 71 is fixed to the inner casing 21 via a connection means, here an elongated fixing element 73 in the region of the exit of the steering spindle 3. The target element 71 is displaceable in the longitudinal direction relative to the outer casing 22, for example guided movably on the outer casing 22 by a linear guide or the like.

In the case of a longitudinal adjustment, the target element 71 is correspondingly moved relative to the support unit 4 in the adjustment direction given by the longitudinal axis L, that is to say is moved forward or rearward in the first adjustment direction with respect to the support unit 4, as is indicated by the double arrow in FIG. 4.

In the case of a height adjustment, the target element 71 together with the casing unit 2 is moved upwards or downwards relative to the support unit 4 in the height direction H, as indicated by the double arrow in FIG. 4.

The sensor element 72 is connected to the support unit 4 in a positionally fixed manner relative to the casing unit 2, for example fixed to a side wall 43 of the support unit 4. Accordingly, the target element 71 is moved parallel to a measurement plane spanned by the longitudinal axis L and the height direction—the so-called L-H measurement plane—relative to the sensor element 72. This relative movement can take place correspondingly two-dimensionally in the two adjustment directions defined by the longitudinal axis L and the vertical direction H.

Figure 5:
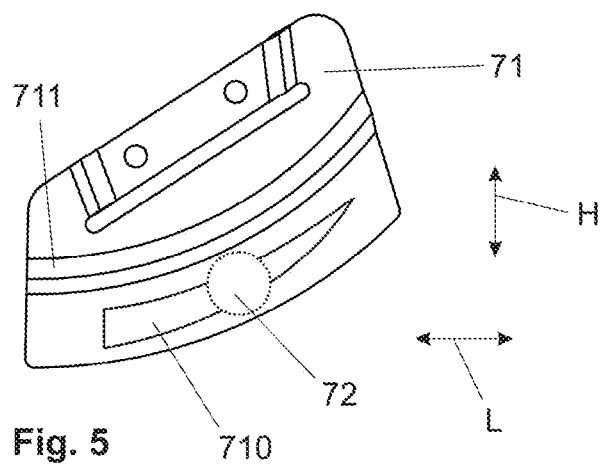
FIG. 5 is a view of a target element according to the disclosure of the steering column according to FIGS. 1 to 4 in separate representation.

The target element 71 according to the disclosure is depicted separately in FIG. 5 together with the sensor element 72—again shown schematically in dashed lines. It can be clearly seen how the target element 71 extends in a planar manner parallel to the L-H measurement plane.

The target element 71 can preferably be configured as one piece from a metallic material, for example as a cold formed part from steel or the like. It is also possible for it to have a ferromagnetic or ferrimagnetic material which can be embedded, for example, in a plastic matrix. The target element 71 can then also be configured, for example, as a preferably one-piece plastic injection-moulded part or have such a part.

In order to form a measuring quantity which varies according to the disclosure over the L-H measurement plane, the target element 71 can have, in a measurement portion which is extended in a planar manner and which can be extended over a partial surface or the entire surface of the target element 71, for example, one or more perforations 710 and, in addition or alternatively, thickness changes 711, such as local thickenings and/or thinnings, for example groove-shaped depressions or indentations, and/or bead-like or web-like projections or the like.

The perforations 710 or the thickness changes 711 generate a local magnetic conductivity varying in the two adjustment directions L and H. This can be measured locally by means of the sensor element 72 having at least one inductive sensor and output to a control unit as a two-dimensional measured value.

It can also not be explicitly described here how other two-dimensional measurement methods between the planar target element 71 and the corresponding sensor element 72 are realized, for example also by a local capacitive or optical measurement, measurement by means of ultrasound or the like, or by other position-sensitive measurement methods in the area.

The methods and systems of the present disclosure, as described above and shown in the drawings provide for a steering system with superior properties including increased reliability, decreased costs, and ease of assembly and use. While the apparatus and methods of the subject disclosure have been showing and described with reference to embodiments, those skilled in the art will readily appreciate that changes and/or modifications may be made thereto without departing from the spirit and score of the subject disclosure.

LIST OF REFERENCE SIGNS

1 Steering column
2 Casing unit
21 Inner casing
22 Outer casing
3 Steering spindle
31 Fastening portion
32 Steering wheel
4 Support unit
41 Fastening means
42 Pivot axis
43 Side wall
5 Adjusting drive
6 Adjusting drive
7 Position detection device
71 Target element (=target unit)
710 Perforations
711 Thickness changes
72 Sensor element
73 Fixing element
L Longitudinal axis
H Height direction

What is claimed is:
1. A steering column for a motor vehicle comprising:
a first component;
a second component, wherein the first component and the second component are adjustable relative to one another in two non-parallel adjustment directions;
a position detection device having a sensor connected to the first component including at least one sensor unit; and
a sensor target connected to the second component comprising at least one target unit, wherein the sensor is configured to detect relative position of the sensor target, wherein the target unit includes a measurement portion extending in the two adjustment directions which has a local measuring quantity varying in each of the two adjustment directions that can be detected locally by the sensor unit;
wherein the sensor unit is configured for inductive detection of the sensor target and the target unit has a target element which has locally varying magnetic properties;
wherein the target element has perforations and/or thickness changes which vary over its surface extent and are normal to its surface extent.
2. The steering system of claim 1, wherein the target unit extends in a planar manner in the two adjustment directions.
3. The steering column of claim 1, wherein the target unit is configured as one component.
4. The steering column of claim 1, wherein the target unit is configured as one piece.
5. The steering column of claim 1, wherein the sensor unit is configured for capacitive measurement of a local capacitive measuring quantity of the target unit which varies over the surface, and the target unit has a locally varying capacitive measuring quantity.
6. The steering column of claim 1, wherein the sensor unit is configured for transmissive cross-sectional measurement of one of a local cross-sectional measuring quantity of the target unit which varies over the surface, and the target unit has a locally varying transmissive cross-sectional measuring quantity.
7. The steering column of claim 1, wherein the position detection device has an electronic control unit.
8. The steering column of claim 1, wherein motorized adjusting drives are provided for adjusting the components.
9. The steering column of claim 1, wherein one of the components is a setting unit, a casing unit or a support unit.
10. The steering column of claim 1, wherein the sensor has an absolute value sensor and/or a relative value sensor.
11. The steering column of claim 1, wherein steering column is configured as a steer-by-wire steering column.
12. The steering column of claim 1, wherein the measurement portion extends in a planar manner in a measurement plane parallel to the two non-parallel adjustment directions.
13. The steering column of claim 1, wherein a magnetic conductivity varies two-dimensionally in a measuring surface of the measurement portion.
14. A steering column for a motor vehicle comprising:
a first component;
a second component, wherein the first component and the second component are adjustable relative to one another in two non-parallel adjustment directions;
a position detection device having a sensor connected to the first component including at least one sensor unit; and
a sensor target connected to the second component comprising at least one target unit, wherein the sensor is configured to detect relative position of the sensor target, wherein the target unit includes a measurement portion extending in the two adjustment directions which has a local measuring quantity varying in each of the two adjustment directions that can be detected locally by the sensor unit;
wherein the measurement portion extends in a planar manner in a measurement plane parallel to the two non-parallel adjustment directions.
15. The steering column of claim 14, wherein the sensor unit is configured for capacitive measurement of a local capacitive measuring quantity of the target unit which varies over the surface, and the target unit has a locally varying capacitive measuring quantity.
16. The steering column of claim 14, wherein the sensor unit is configured for transmissive cross-sectional measurement of one of a local cross-sectional measuring quantity of the target unit which varies over the surface, and the target unit has a locally varying transmissive cross-sectional measuring quantity.
17. A steering column for a motor vehicle comprising:
a first component;
a second component, wherein the first component and the second component are adjustable relative to one another in two non-parallel adjustment directions;
a position detection device having a sensor connected to the first component including at least one sensor unit; and
a sensor target connected to the second component comprising at least one target unit, wherein the sensor is configured to detect relative position of the sensor target, wherein the target unit includes a measurement portion extending in the two adjustment directions which has a local measuring quantity varying in each of the two adjustment directions that can be detected locally by the sensor unit;

wherein a magnetic conductivity varies two-dimensionally in a measuring surface of the measurement portion.

18. The steering column of claim 17, wherein the sensor unit is configured for capacitive measurement of a local capacitive measuring quantity of the target unit which varies over the surface, and the target unit has a locally varying capacitive measuring quantity.

19. The steering column of claim 17, wherein the sensor unit is configured for transmissive cross-sectional measurement of one of a local cross-sectional measuring quantity of the target unit which varies over the surface, and the target unit has a locally varying transmissive cross-sectional measuring quantity.

* * * * *